United States Patent [19]
Esteve

[11] Patent Number: 6,088,924
[45] Date of Patent: Jul. 18, 2000

[54] MACHINE FOR GRINDING A CYLINDRICAL PIECE IN ORBITAL MOTION

[75] Inventor: Xavier Esteve, Marin, Switzerland

[73] Assignee: Etamic SA, Entrees, France

[21] Appl. No.: 09/043,889

[22] PCT Filed: Oct. 6, 1996

[86] PCT No.: PCT/FR96/01545

§ 371 Date: Mar. 31, 1998

§ 102(e) Date: Mar. 31, 1998

[87] PCT Pub. No.: WO97/13614

PCT Pub. Date: Apr. 17, 1997

[30] Foreign Application Priority Data

Oct. 6, 1995 [FR] France .................................. 95 11784
Jun. 17, 1996 [FR] France .................................. 96 07487

[51] Int. Cl.[7] ........................................................ G01B 5/20
[52] U.S. Cl. ................................................ 33/551.1; 33/550
[58] Field of Search ............................ 33/551.1, 72, 550, 33/555, 549, 178, 551.2, 555.1, 555.3, 553; 451/358

[56] References Cited

U.S. PATENT DOCUMENTS

| 1,941,456 | 1/1934 | Arnold . | |
| 4,414,748 | 11/1983 | Gauler et al. | 33/550 |
| 4,429,464 | 2/1984 | Burrus | 33/550 |
| 4,625,413 | 12/1986 | Possati et al. | 33/551 |
| 4,637,144 | 1/1987 | Schaudt . | |
| 4,958,442 | 9/1990 | Eckhardt | 33/550 |
| 5,086,569 | 2/1992 | Possati et al. | 33/550 |
| 5,150,545 | 9/1992 | Meseltron . | |

FOREIGN PATENT DOCUMENTS 4419656 1/1996 Germany .

*Primary Examiner*—Diego Gutierrez
*Assistant Examiner*—Maria Fernandez
*Attorney, Agent, or Firm*—Birch, Stewart, Kolasch & Birch, LLP

[57] ABSTRACT

A device for measuring and/or checking the diameter of a cylindrical part (2) moving orbitally about an axis (3) during a grinding process. The device comprises a measuring head (7) coupled to a holder (18, 22) which is provided with a member (26) for engaging the circumference of the part (2), and is movably mounted in a direction parallel to itself on a frame (31) so that it can follow the orbital motion of the part (2). Grinding is performed by means of a tool (1) moving transversely to said axis (3), and the frame (31) is moved transversely to said axis and synchronised with the motion of the tool (1).

12 Claims, 4 Drawing Sheets

FIG_1

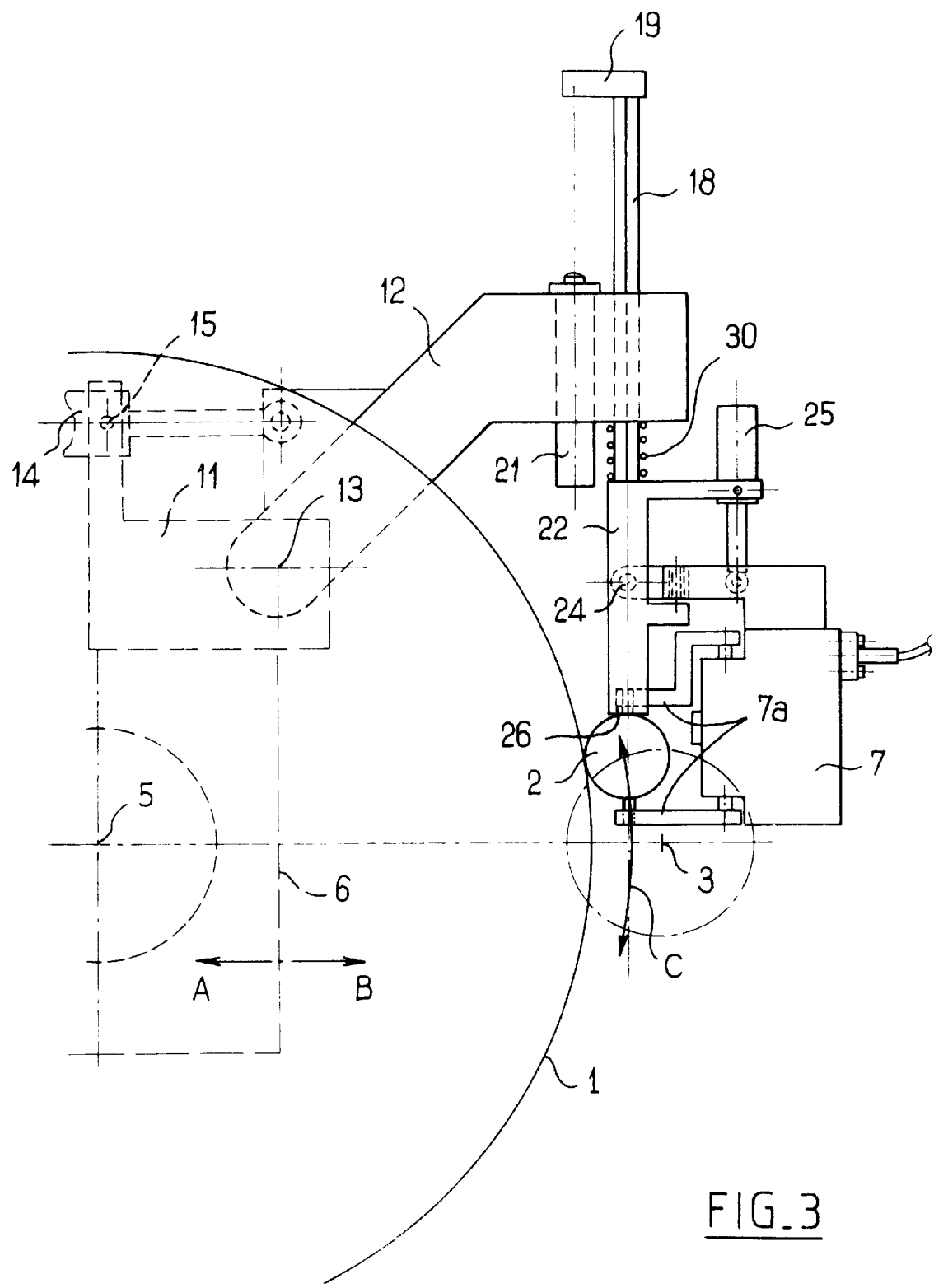
FIG_3

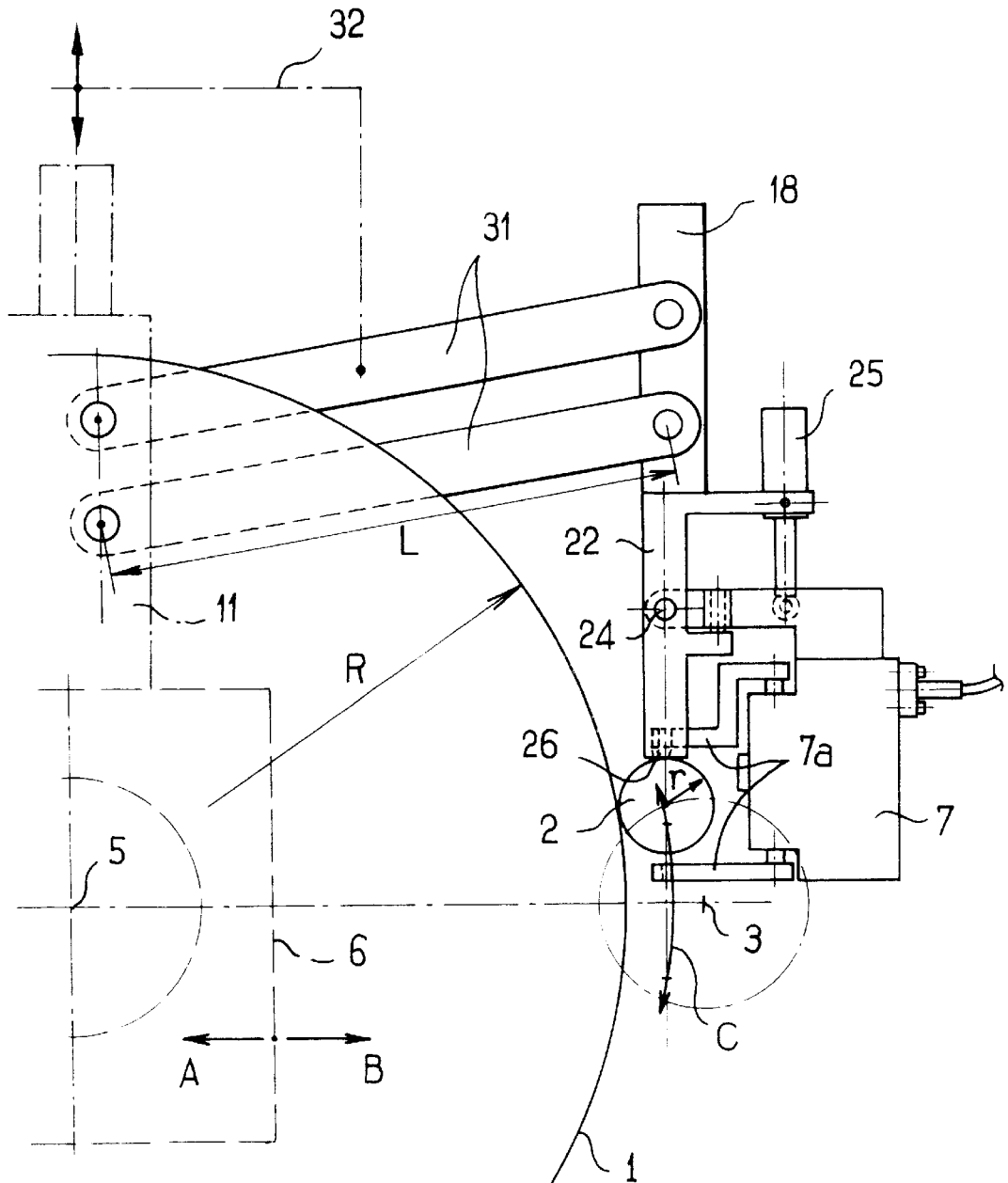
FIG_4

MACHINE FOR GRINDING A CYLINDRICAL PIECE IN ORBITAL MOTION

The present invention relates essentially, but not exclusively, to inspecting the diameter dimension of crank pins while they are being ground.

BACKGROUND OF THE INVENTION

A device for performing that type of inspection is known, in particular from document (FR 2 567 058). However, the means that it implements suffer from major drawbacks in applications where machining time constitutes a non-negligible factor in the cost price of the pieces being machined. With the known device it is necessary to stop the crank shaft rotating and to put the apparatus manually into contact with the crank pin that is to be inspected. Even if the operation of putting the inspection apparatus into contact with the crank pin were to be automated, and likewise the taking out of contact thereof, it would still be necessary to stop the rotating crank shaft in a determined angular position. That known apparatus therefore gives rise to a loss of productivity when grinding crank pins.

OBJECTS AND SUMMARY OF THE INVENTION

To mitigate that drawback, the invention provides a device for measuring and/or inspecting the diameter of a cylindrical piece in orbital motion about an axis while it is being ground, the device comprising a measurement head coupled to a support, which support is fitted with a member for bearing against the periphery of the piece and is mounted to move parallel to itself on a frame so as to be able to accompany the orbital motion of the piece; grinding being performed by means of a tool that is movable transversely relative to said axis, the frame being mounted to move transversely relative to said axis with motion that is synchronized with the motion of the tool.

It will be understood that by synchronizing the motion of the measuring instrument frame with the motion of the tool, the measuring instrument, or more exactly the member whereby its support bears against the piece, is placed in a frame of reference in which the orbital motion is reduced to simpler motion that includes, in particular, a reversing point at which the speed of the piece becomes zero, which point is favorable for making contact with the bearing member.

Preferably, the moving tool is carried by a carriage and the frame of the device is coupled to the carriage. That is the simplest manner of synchronizing the motion of the frame with the motion of the tool.

BRIEF DESCRIPTION OF THE DRAWINGS

Other characteristics and advantages of the invention appear from the description of an embodiment given below.

Reference is made to the accompanying drawings, in which:

FIG. 3 is a diagrammatic view of a first variant embodiment of the device shown in FIG. 1; and FIG. 4 is a diagrammatic view of a second variant embodiment of the device of the invention.

MORE DETAILED DESCRIPTION

Figure 1:
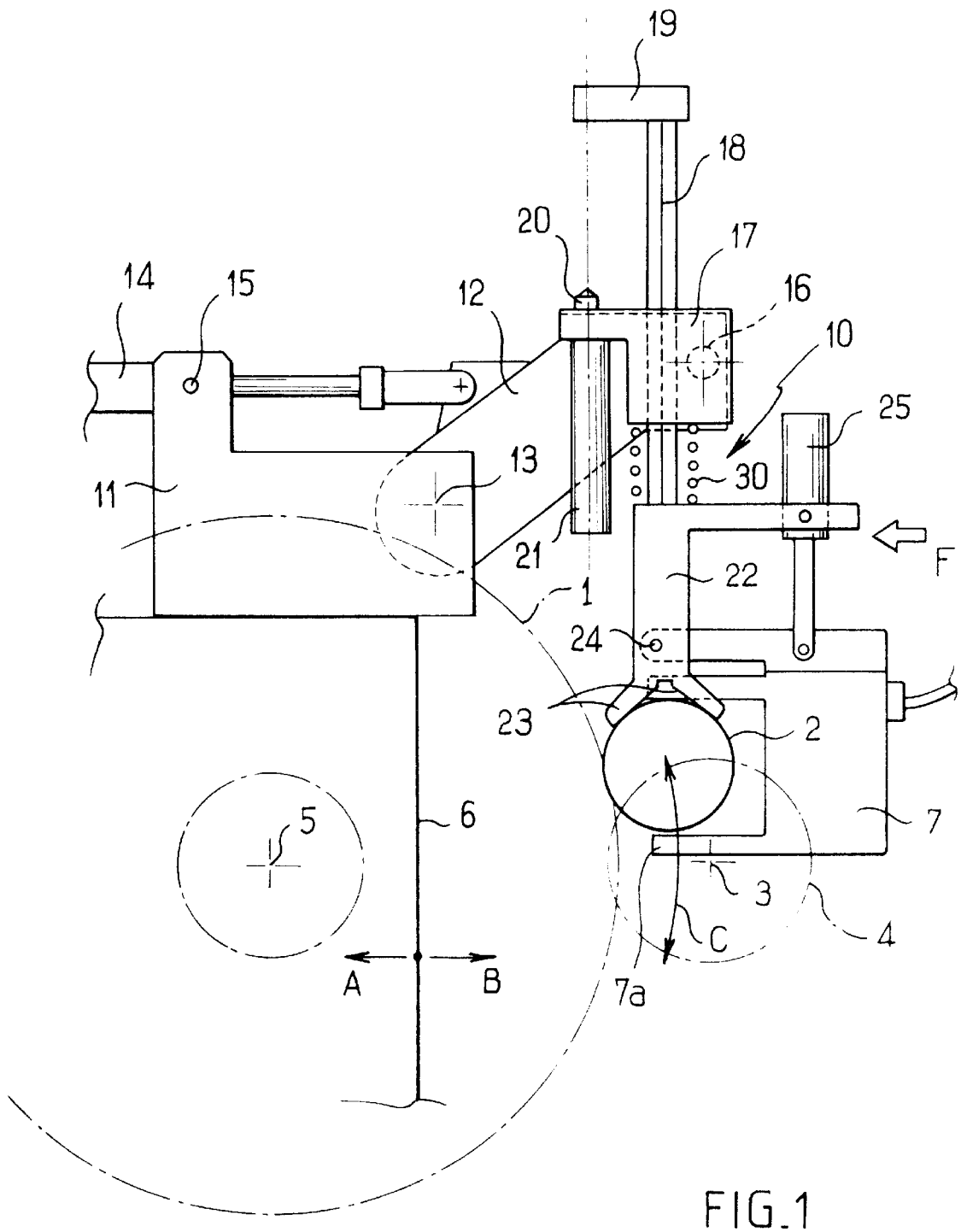
FIG. 1 is a diagrammatic view of a measurement device of the invention associated with a grinder tool.

In the examples described below, the invention is applied to using a wheel 1 to grind a crank pin 2 of a crank shaft whose axis of rotation is referenced 3 in the figures. The axis of rotation 3 of the crank shaft is held relative to the frame of the machine (not shown), and the pin 2 describes orbital motion about said axis 3 as symbolized by the circle 4 described by the center of the pin 2.

The grindwheel 1 is mounted to rotate about an axis 5 carried by a carriage 6 which moves with reciprocating motion AB orthogonally to the axis 3. The angular position of the pin 2 relative to the axis 3 and the position of the axis 5 relative to the axis 3 are servo-controlled as a function of a determined grinding program.

The diameter of the pin is inspected in conventional manner by a measurement head 7 which possesses feelers at the end of a fork 7a serving to deliver a signal representative of the diameter of the pin 2. The measurement head is known per se and is available on the market.

Figure 2:
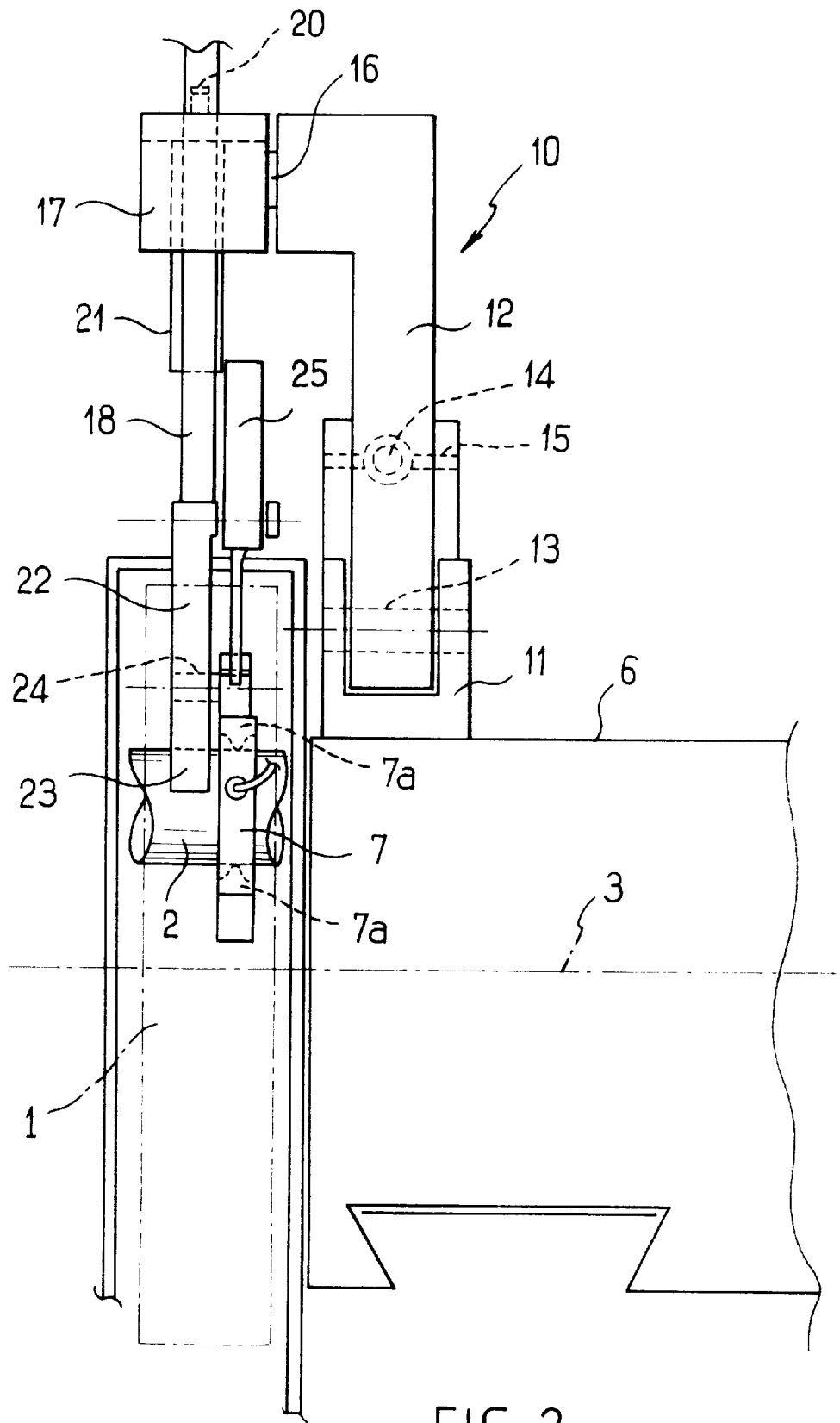
FIG. 2 is a view along F in FIG. 1.

The invention relates to the device for holding the head, which device is designed to make it as simple as possible to put the head into operation and to take it out of operation while the pin 2 is being machined. The device is given overall reference 10 in the figures. In FIGS. 1 and 2 it comprises firstly a fixing piece 11 secured to the wheel-carrying carriage 6 and having a frame 12 in the form of a lever hinged thereto. The frame 12 can pivot relative to the fixing piece 11 about an axis 13, and its angular position about said axis is set by an actuator 14, itself hinged to the fixing piece 11 at 15.

The lever-shaped frame 12 has another hinge axis 16 at its end remote from its end hinged at 13, and serving to engage a guide piece 17. The guide piece 17 slidably receives a support rod 18 of section that is preferably non-circular to constitute means for preventing the rod rotating about its own longitudinal axis relative to the guide. In an equivalent variant (not shown) it is possible to use two parallel columns of circular section that are interconnected via their ends to achieve the same effect of preventing the sliding assembly from rotating in the guide.

At one of its ends, the rod 18 has a driver dog 19 which extends over the end of a rod 20 of an actuator 21 carried by the guide piece 17. At its bottom end, i.e. at its end beyond the guide piece going away from the dog 19, the rod 18 possesses a support 22 fitted with a bearing member 23, shown here in the form of a V-shape for coming into contact with the pin 2, said support 22 carrying the measurement head 7 by means of a hinge axis 24. An actuator 25 also hinged to the support 22 and to the measurement head 7 enables said head to be tilted about its axis 24.

In the following explanation of the operation of the device, it is assumed that the frame 12 is fixed, i.e. prevented by means of the actuator 14 from moving relative to the fixing member 11 about the axis 13. The frame thus constitutes a bracket carried by the carriage 16 and carrying at its end the rod 18 which is weighted down at its own bottom end by the elements 22 and 7. The rod 18 is carried so as to extend substantially vertically while being free to oscillate about the axis 16, with it being possible for the amplitude of oscillation about the axis 16 to be limited by abutments (not shown).

In the frame of reference of the carriage 6, the motion of the pin is reciprocating motion as represented by arrow C. The top and bottom ends of arrow C thus constitute reversing points at which the speed of the pin 2 in the frame of reference of the carriage 6 becomes zero. Thus, when it is time to inspect the diameter reached by the pin while it is being machined, inspection takes place with the device in a state such that the rod 20 of the actuator 21 is extended so that it constitutes an abutment against downward sliding of the rod 18 in the guide 17 under the effect of the weight of the equipments 22 and 7 carried by the bottom portion of said rod 18, with the bearing V-shape 23 of the support 22 being at a distance from the pin 2. The rod of actuator 25 is also retracted so that the measurement head 7 is tilted upwards about the axis 24.

The actuator 21 is used to control descent of the equipment 7, 22 down to the vicinity of the top position reached by the pin 2. When the pin is indeed in this position, the bearing member 23 is brought into contact with the pin 2, with said contact being performed at zero or substantially zero speed since it takes place in the vicinity of the top reversing point of the pin, and the rod 20 is fully retracted. The moving equipment sliding in the guide piece 17 then bears on the pin 2, via the bearing member 23, and under the effect of its own weight. It therefore follows the motion of the pin, with this being possible firstly because the rod 18 slides in the guide 17, and secondly because of the hinge 16 between the guide piece 17 and the frame 12 which allows the rod 18 to oscillate, given that the reciprocating motion of the pin is not exactly rectilinear. The thrust of the member 23 against the pin 2 can be assisted by any appropriate return member (spring, actuator, . . . ) placed between the guide piece 17 and the support 22, as symbolized by the spring 30 in FIG. 1.

Once the support 22 is in contact with the pin 2, pivoting of the head 7 is controlled by controlling the actuator 25, thereby placing the end of the measurement fork 7a in register with a diameter of the pin. Once the design dimension is reached, the measurement head issues a signal firstly to cause machining to stop, and secondly to raise the head 7 by retracting the actuator 25 and then to lift the entire moving equipment by means of the actuator 21 with this taking place during the end of the machining operation. Where necessary, the actuator 14 may also be retracted to cause the frame 12 to pivot about the axis 13 and to disengage completely the space situated in the vicinity of the grindwheel 1. In conventional manner, it is then possible to move on to the following crank pin of the crank shaft by driving the carriage which carries the axis 3, or else, if pin machining has been completed, to put the next crank shaft into place.

In the embodiment shown in FIG. 3, certain elements as described above are to be found again with the same references. In this case, it will be observed that the guide piece 17 is secured to the frame 12 (or indeed is integral therewith).

The support 22 does not have a bearing V-shape. This support bears against the pin 2 via a plane surface 26 carried at the bottom end of the support. This contact is a sliding contact on the pin 2, thereby making it possible to avoid. This bearing surface can be reduced to a single line, such as the bottom generator line of a rod carried by the support 22 and extending transversely to the pin 2, for example.

Naturally the measurement fork 7a coupled to said bearing surface is no longer kept constantly in register with a diameter of the pin: relative horizontal motion is possible between the pin and the surface 26 and thus between the pin and the fork 7a. However, given the shape of the device and the dimensions of its various components, it is possible to provide a program to compute corrections for the measurements taken so as to be continuously informed about the value of the pin diameter.

An elegant manner of mitigating this drawback lies in adjusting the device in such a manner that, in a frame of reference associated with the frame 12, the circularly arcuate locus of the center of the pin is intersected by the vertical axis between the two measurement feelers of the fork 7a. Thus, on one orbit of the pin, there will be four positions corresponding to an exact measurement of the diameter of the pin. These four positions are reduced to two when the vertical axis between the two measurement feelers intersects the circularly arcuate locus of the center of the pin at the reversing points of the center, or when said axis is tangential to said circularly arcuate locus.

These values are particularly easy to select in that they constitute maximum values amongst all of the values read over the corresponding fraction of a turn. In the event of the radius of the grindwheel being reduced by wear or by trimming to a value such that the vertical axis between the two measurement feelers runs the risk of no longer intersecting the circularly arcuate locus of the center of the pin, it becomes necessary to adjust the fork 7a relative to the sliding assembly. In practice, the grindwheels used hardly wear at all, so frequent adjustment is unnecessary.

Finally, with reference to FIG. 4, it will be observed that the variant shown in this figure differs from that of FIG. 3 in that it no longer includes the frame 12. It is replaced by a set of parallel links 31 hinged between the carriage 11 and the support 18, 22 (rod) carrying the bearing surface (or line) 26. The support 18, 22 can thus be moved in parallel with itself with each of its points describing a circular arc of radius L equal to the distance between the hinges of the links. When the links 31 are parallel to the line between the centers 3 and 5 in the figure and when the center of the crank pin is on said line, if said length L is equal to the sum of the radius R of the tool 1 plus the radius r of the pin 2, it is possible to measure the diameter of the pin between the feelers of the fork 7a on a continuous basis. A shorter length L would enable only four exact values to be obtained per orbit, as in the preceding case. A greater length L would enable two values to be obtained per orbit.

Provision can be made to enable the length L to be adjusted by any appropriate means to match the device to various different radii R and r that it may encounter. The linkage 31, the support 18 and the measurement head 7 are advantageously connectable to a support and driving member 32 for the purpose of disengaging contact with the crank pin when it is time to move on to grinding the next pin.

In the above-described examples, the piece 11 is fixed to the grindwheel-carrying carriage 6. It would not go beyond the ambit of the invention for the piece 11 to be coupled to a member other than the grindwheel-carrying carriage, but that is servo-controlled to move therewith so as to ensure that it performs contact and measurement functions under the same conditions.

What is claimed is:

1. A device for monitoring the diameter of a cylindrical piece in orbital motion about an axis during a grinding thereof by an edge of a rotatable disk-shaped tool mounted on a carriage, said carriage being movable in a transverse direction relative to said axis and said device having a measurement head coupled to a support, said support being provided with a member for contacting the periphery of said piece and being movably mounted relative to a frame in order to follow the orbital motion of said cylindrical piece wherein said frame is secured to said carriage.

2. The device of claim 1, wherein said member is V-shaped in order to contact said cylindrical piece along two generator lines thereof, and wherein said support is slidably mounted in a guide member, said guide member being substantially perpendicular to said transverse direction and mounted to oscillate on said frame.

3. The device of claim 2, wherein said frame is formed by a lever hinged to said carriage by one end, said guide member being pivotally mounted on the other end of said lever, an actuator being coupled between said carriage and said lever to displace and hold said lever angularly with respect to the carriage.

4. The device of claim 1, wherein said member is flat-shaped to contact said cylindrical piece along a top generator line thereof, and wherein said support is slidably mounted in a fixed guide member of said frame perpendicular to said transverse direction.

5. The device claim 1, wherein said member is flat-shaped in order to contact said cylindrical piece along a top generator line thereof, and wherein said support is in the form of two links hinged to said support and to said carriage so as to form a deformable parallelogram with said support and said carriage.

6. The device of claim 5, wherein the length of the links is equal to the sum of the radii of the grinding tool and of the cylindrical piece.

7. The device of claim 6, wherein said length between the hinges of the links is adjustable.

8. The device of claim 1, wherein said support is constituted by at least one substantially vertical rod slidably mounted in a guide member of said frame having said bearing member and said measurement head installed at the bottom end thereof, the other end of the rod being provided with a driver dog for co-operating with the rod of a support-lifting actuator.

9. The device of claim 8, wherein said support rod is cylindrical and of non-circular section.

10. The device of claim 8, wherein the bearing force of the member against said piece is constituted by the weight of the support.

11. The device of claim 8, wherein a return member of said support is coupled between the guide member and the support.

12. The device of claim 1, wherein said measurement head is pivotally mounted on said support to pivot between an active position and a disengaged position.

* * * * *

UNITED STATES PATENT AND TRADEMARK OFFICE
CERTIFICATE OF CORRECTION

PATENT NO. : 6,088,924
DATED : July 18, 2000
INVENTOR(S): Xavier ESTEVE

It is certified that error appears in the above-identified patent and that said Letters Patent are hereby corrected as shown below:

On the title page [54], please change the title from "MACHINE FOR GRINDING A CYLINDRICAL PIECE IN ORBITAL MOTION" to --DEVICE FOR MONITORING THE DIAMETER OF AN ORBITALLY MOBILE CYLINDRICAL PIECE DURING MACHINING THEREOF --.

Signed and Sealed this

First Day of May, 2001

Attest:

NICHOLAS P. GODICI

Attesting Officer     Acting Director of the United States Patent and Trademark Office

UNITED STATES PATENT AND TRADEMARK OFFICE
CERTIFICATE OF CORRECTION

PATENT NO. : 6,088,924
DATED : July 18, 2000
INVENTOR(S) : Xavier Esteve

It is certified that error appears in the above-identified patent and that said Letters Patent is hereby corrected as shown below:

Title page,
In category [22] "PCT Filed", please change the date from "Oct. 6, 1996" to -- Oct. 3, 1996 --.

Signed and Sealed this

Ninth Day of October, 2001

Attest:

*Nicholas P. Godici*

NICHOLAS P. GODICI
*Attesting Officer*    *Acting Director of the United States Patent and Trademark Office*

Adverse Decision in Interference

Patent No. 6,088,924, Xavier Esteve, DEVICE FOR MONITORING THE DIAMETER OF AN ORBITALLY MOBILE CYLINDRICAL PIECE DURING MACHINING THEREOF, Interference No. 105,615, final judgment adverse to the patentees rendered June 19, 2008, as to claims 1-4 and 12.
*(Official Gazette, January 12, 2010)*